Patented Jan. 28, 1936

2,028,980

UNITED STATES PATENT OFFICE 2,028,980

INORGANIC COLORED PIGMENT AND PROCESS OF PREPARING THE SAME

Erich Korinth, Frankfort-on-the-Main-Hochst, and Georg Meder, Munster-in-Taunus, Germany, assignors to I. G. Farbenindustrie Aktiengesellschaft, Frankfort-on-the-Main, Germany No Drawing. Application February 3, 1932, Serial No. 590,775. In Germany February 11, 1931

11 Claims. (Cl. 134—78)

Our present invention relates to inorganic colored pigments and a process of preparing the same, more particularly it relates to pigments which are obtainable by thermal combination of zinc oxide with an oxide of the type MeO, wherein Me represents a metal of the group consisting of Cd, Mg, Fe and Mn, by which combination mixed crystals or solid solutions are formed.

It is known that by heating zinc oxide with cobalt compounds, particularly with cobaltous oxide, an excellent green colored pigment, Rinnmann's green, is obtained. According to the researches of I. A. Hedvall (Zeitschrift für anorganische und allgemeine Chemie 1915, vol. 92, page 201) this pigment represents a solid solution of hexagonal ZnO and regular CoO, from which solution is derived an isodimorphous series of mixed crystals (crystalized solid solutions). It is also known that in a similar manner other metal oxides may be combined with CoO, provided that the chemical type and the lattice construction of the oxides permit such combination. Thus, for instance, a rose-colored mixed crystal of the type MgO.CoO has been prepared (compare: Zeitschrift für anorganische Chemie 1914, vol. 86, page 296). From MnO or NiO on the one side and CoO on the other side there are obtained mixed crystals, the color of which shifts from yellow-green over green-brown to red (Zeitschrift für anorganische Chemie and allgemeine Chemie 1915, vol. 92, page 381).

We have now found that new pigments of a new structure are obtainable if in the molecular construction forming the basis of the pigment Rinnmann's green the zinc oxide is retained but the cobaltous oxide is replaced by another suitable metal oxide of an equivalent or similar type and of a similar lattice construction. For the formation of such new pigments of new structure there may be used, hypothetically, one of the oxides of the elements of the isomorphous series (Nernst, Theoretische Chemie, 7th ed. 1913, page 174), namely Zn, Cd, Mg, Fe, Mn, Co, Ni, Be, Ru, Os, Pd, Ir, Cu, Ca, Re, Ma.

We have found that the elements Cd, Mg, Fe, and Mn are particularly useful and suitable for the purpose of the present invention. Our new pigments obtainable by thermal combination of ZnO with an oxide of the said elements possess coloring properties which are at least as good as those of the pigment Rinnmann's green; their shades, however, differ considerably from that of Rinnmann's green. Thus, for instance, an excellent bright red color is obtained by replacing in Rinnmann's green CoO by MnO. The replacement of CoO by FeO yields a series of olive-colored pigments. If CoO is replaced by CdO, green-yellow pigments are formed; combination of ZnO with MgO results in the formation of white pigments.

The thermal combination of the oxides may particularly advantageously be performed by using as starting materials instead of the oxides themselves, suitable metal compounds capable of forming the corresponding oxides. The metal oxides are thus formed by thermal dissociation during the formation of the pigments. We have found that the sulfates of the metals disclosed above are particularly useful due to their high decomposing point.

The duration and the temperature of the process for the formation of the pigments may be reduced by adding in known manner fluxes or mineralizers, for instance, KCl, $Na_2SO_4$, etc. The reaction between the components is generally carried out at temperatures between about 800° C. and about 1100° C. Higher temperatures may be used but are unnecessary if the substances are heated to the said temperatures for a sufficient time. It is essential that the "coloring" metal oxide used for combination with zinc oxide at the end of the operation must be present in the degree of oxidation corresponding with the formula MeO. If, therefore, a metal oxide of a higher degree of oxidation is used as starting material, the heating operation has to be carred out in a gaseous atmosphere having a reducing action sufficient for producing and maintaining the state of oxidation of MeO.

The following examples serve to illustrate the invention but they are not intended to limit it thereto; the parts are by weight:

1. (a) 94 parts of $ZnSO_4.7H_2O$ and 6 parts of $MnSO_4.4H_2O$ are intimately mixed and heated to about 1000° C. in order to expel $SO_3$. The product is then reduced so that the manganese is in the state of oxidation of MnO, for instance, by heating in a current of gas consisting of about 50 percent by volume of CO and 50 percent by volume of $CO_2$. There is obtained a beautiful, orange brown pigment of good fastness properties.

(b) By using 98 parts of $ZnSO_4.7H_2O$ and 2 parts of $MnSO_4.4H_2O$ there is obtained a fiery orange pigment if the heating operation is carried out in a reducing atmosphere in which MnO is stable.

(c) 99.4 parts of $ZnSO_4.7H_2O$ and 0.3 part of $MnSO_4.4H_2O$ yield on being treated as indicated under (a) a yolk colored pigment.

(d) 99.8 parts of $ZnSO_4.7H_2O$ and 0.2 part of $MnSO_4.4H_2O$ yield a pigment of a light yellow color.

2. By proceeding as indicated in Example 1, there are obtained from $ZnSO_4$ and $FeSO_4$, according to proportion of iron, after the reduction dark olive-green to light yellow-green pigments.

We claim:

1. The process of producing pigments which comprises causing practically pure zinc oxide to combine with a metal oxide of the type MeO, wherein Me represents a metal of the group consisting of Cd, Mg, Fe and Mn, by thermal combination whereby mixed crystals or solid solutions are formed.

2. The process of producing pigments which comprises combining practically pure zinc oxide and a metal oxide of the type MeO, wherein Me represents a metal of the group consisting of Cd, Mg, Fe and Mn to form mixed crystals or solid solutions by thermal combination of the components at temperatures between about 800° C. and about 1100° C.

3. The process of producing colored pigments which comprises combining practically pure zinc oxide and ferrous oxide to form mixed crystals or solid solutions by heating together zinc sulfate and ferrous sulfate at about 1000° C. and heating the resulting product in a gaseous atmosphere having a reducing action to form the oxide FeO.

4. The process of producing colored pigments which comprises combining practically pure zinc oxide and manganous oxide to form mixed crystals or solid solutions by heating together zinc sulfate and manganous sulfate at about 1000° C. and heating resulting product in a gaseous atmosphere having a reducing action to form the oxide MnO.

5. As new products, inorganic pigments comprising mixed crystals containing in their lattice construction practically pure zinc oxide and a metal oxide of the type MeO, wherein Me represents a metal of the group consisting of Cd, Mg, Fe and Mn, which pigments are obtainable by thermal combination of the said metal oxides.

6. As new products, inorganic pigments consisting of mixed crystals containing in their lattice construction practically pure zinc oxide and a metal oxide of the type MeO, wherein Me represents a metal of the group consisting of Cd, Mg, Fe and Mn.

7. As new products, inorganic colored pigments, consisting of mixed crystals containing in their lattice construction practically pure zinc oxide and ferrous oxide being obtainable by thermal combination of the said oxides, which pigments possess dark-olive to light yellow green shades.

8. As new products, inorganic colored pigments consisting of mixed crystals containing in their lattice construction practically pure zinc oxide and manganous oxide being obtainable by thermal combination of the said oxides, which pigments possess brown to red to yellow shades.

9. As a new product, a chestnut-brown to bright red pigment consisting of mixed crystals containing in their lattice construction practically pure zinc oxide and manganous oxide.

10. The process of producing pigments which comprises combining practically pure zinc oxide and a metal oxide of the type MeO, wherein Me represents a metal of the group consisting of Cd, Mg, Fe and Mn to form mixed crystals or solid solutions by heating the components at temperatures between about 800° C. and about 1100° C. in a gaseous atmosphere having a reducing action to form the oxide MeO.

11. The process of producing pigments which comprises causing a practically pure zinc compound capable of forming zinc oxide by thermal dissociation to act upon a compound of a metal of the group consisting of Cd, Mg, Fe and Mn said second mentioned compound being capable of forming the corresponding metal oxide of the type MeO by thermal dissociation, by heating the metal compounds together at temperatures of between about 800° C. and about 1100° C. in a gaseous atmosphere having a reducing action to form the oxide MeO.

ERICH KORINTH.
GEORG MEDER.